Oct. 9, 1934.　　　　H. S. GATES　　　　1,976,609

ELECTRICAL APPARATUS

Filed Jan. 23, 1934　　　3 Sheets-Sheet 1

WITNESSES:
C. J. Weller.
Ain. C. Groome

INVENTOR
Henry S. Gates.
BY
Franklin E. Hardy
ATTORNEY

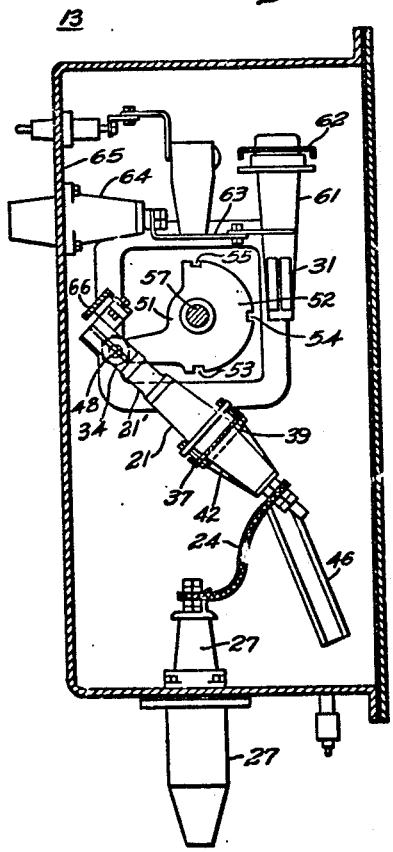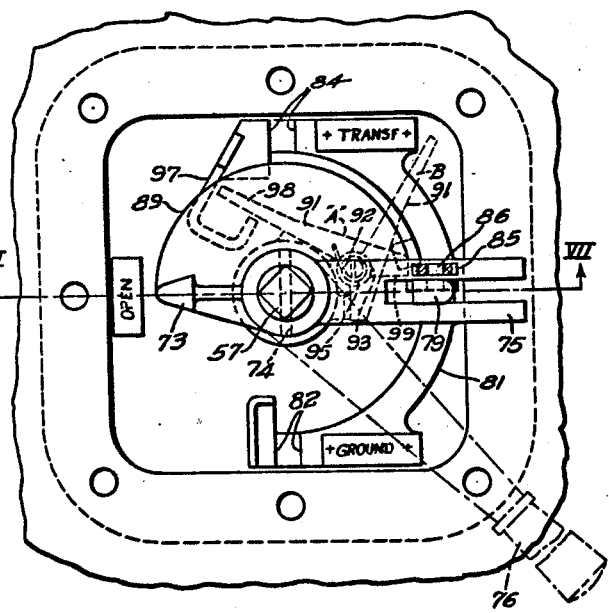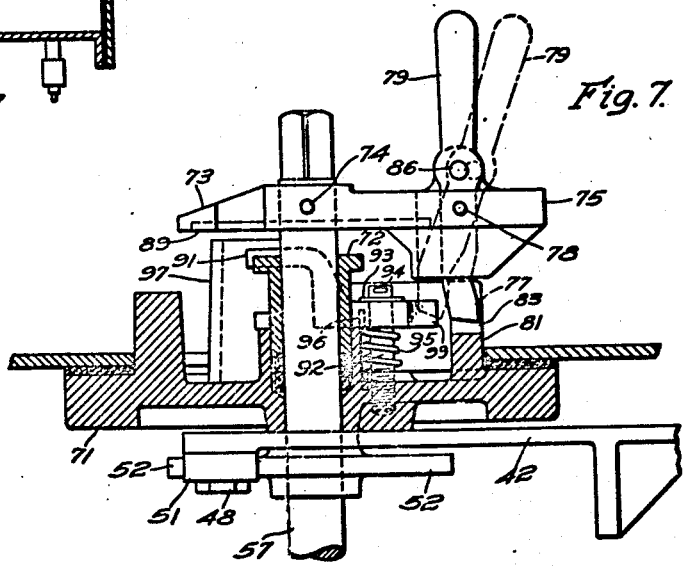

Patented Oct. 9, 1934

1,976,609

UNITED STATES PATENT OFFICE 1,976,609

ELECTRICAL APPARATUS

Henry S. Gates, Sharon, Pa., assignor to Westinghouse Electric & Manufacturing Company, East Pittsburgh, Pa., a corporation of Pennsylvania Application January 23, 1934, Serial No. 707,896

6 Claims. (Cl. 171—97)

My invention relates to improvements in grounding switches for electrical apparatus and particularly to grounding switches provided with a number of safety features for preventing improper operation of the switch.

In the operation of electrical apparatus, such as transformers, it is desirable to disconnect the transformer from the power circuit and when repairs or changes are to be made to ground the high-voltage feeder in order to protect the workmen from injury in case someone should accidentally throw the line breaker to its closed position and again connect the transformer to the circuit. It is also desirable to provide for preventing the improper operation of the grounding switch, such, for example, as moving it to its grounding position when the transformer or feeder is energized, which operation might cause serious damage to the apparatus or persons.

I have provided a three-position switch for connecting or disconnecting the transformer to or from a transmission line or feeder, and for connecting the feeder conductors to ground when the transformer and feeder are deenergized and it is desired to prevent accidental connection of the transformer to a source voltage supply. Unless means is provided for preventing it, the switch might be operated from either its open circuit position, or its closed or transformer connecting position, to its grounding position while the transformer or feeder is energized.

The three-position grounding switch described in this application is applicable for use with transformers employed in connection with network systems, usually termed primary networks, but may also be used in connection with secondary networks or other applications where the features to be described are found to be desirable.

In a primary network system employing a number of transformers supplied from the same feeder circuit, it is necessary to disconnect the entire feeder or feeder section, from its source of power supply in order to deenergize the feeder when it becomes necessary to disconnect one of the transformer units from the circuit.

In order to give the desired protection, electrical and mechanical interlocks are provided that prevent the grounding switch from being moved from its open circuit position, or from its transformer connecting position, when the transformer is energized, thus preventing interruption of load currents through the grounding switch. These interlocks also prevent the operation of the switch from its open position to its grounding position directly, thus preventing connecting the power circuit conductors to ground while energized, which operation would result in a heavy grounding current and possibly an explosion of the switch. In order to operate the switch from its open to its grounding position, it must first be operated to its transformer connecting position. If this operation results in energizing the transformer, an electrical interlock will operate to lock the switch against further operation until the transformer is again deenergized.

It is an object of my invention to provide a switch for connecting the conductors of an electrical circuit to the windings of an electrical apparatus, or to ground, and for disconnecting them therefrom, and to provide for preventing the operation of the switch to the grounding position when the apparatus is energized.

It is more specifically an object of my invention to provide means for preventing the operation of a three-position grounding switch from its apparatus connecting position to its grounding position when the apparatus is energized, and to prevent operation of the grounding position unless it is first operated to its apparatus connecting position.

Other objects will be apparent from the following description of an operative embodiment of my invention, when taken together with the drawings illustrating the same.

In the drawings,

Fig. 5 is a sectional view similar to Fig. 3, but showing the switch in its grounding position.

Fig. 6 is an enlarged view of the operating handle and the interlocking mechanism associated therewith, and Fig. 7 is a sectional view taken along the line VII—VII of Fig. 6.

Figure 1:
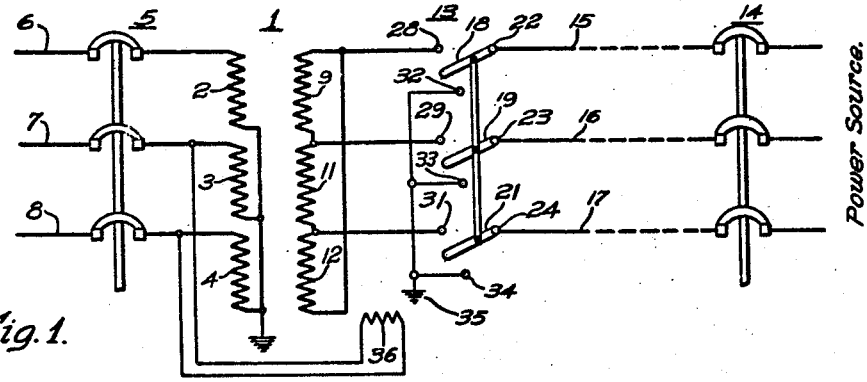
Figure 1 is a schematic view illustrating a three-phase transformer, its primary and secondary circuits, and a three-phase grounding switch connected in one of the circuits.

Referring to the drawings, Fig. 1 illustrates a transformer 1 having low voltage windings 2, 3 and 4 connected by means of a circuit breaker, or network protector 5 to the three conductors of a low voltage three-phase circuit 6, 7 and 8 and high voltage windings 9, 11 and 12 that may be connected through the three-phase short circuiting and grounding switch 13 to high voltage feeder conductors 15, 16 and 17, and through the station circuit breaker 14, to a high voltage power supply source at a power station or sub-station. The conductors 6, 7 and 8 may represent a network that is supplied through a number of transformers, the primary windings of at least some of which are supplied from a different feeder circuit than the one supplying the transformer 1. The circuit breaker 5 may be a network protector that is automatically opened upon a reversal of the direction of power flow through the circuit breaker from its normal direction. Such a protective device is well known and is disclosed in the system covered in the patent to G. E. Palmer 1,597,865, August 31, 1926 and assigned to the same assignee as this application.

The grounding switch 13 is provided with three movable contact members which may be carried in bushing assemblies 18, 19 and 21 and which are respectively connected through connectors that are connected to a high voltage current source through connectors 22, 23 and 24 and bushings 25, 26 and 27 that extend through a wall of the switch housing. The upper ends of the movable contact members are provided with terminals 18', 19' and 21' that respectively engage contact members 28, 29 and 31 that are connected to the terminals of the high voltage winding 9 through 12 of the transformer. Upon operation of the switch to its grounding position, the terminals 18', 19' and 21' engage respectively the contact members 32, 33 and 34 that are connected to a common ground at 35. The grounding terminals 32, 33 and 34 are mounted behind the bushings 18, 19 and 21 as viewed in Figs. 2 and 4, in the position shown for contact member 34 in Figs. 3 and 4.

Figures 2, 3:
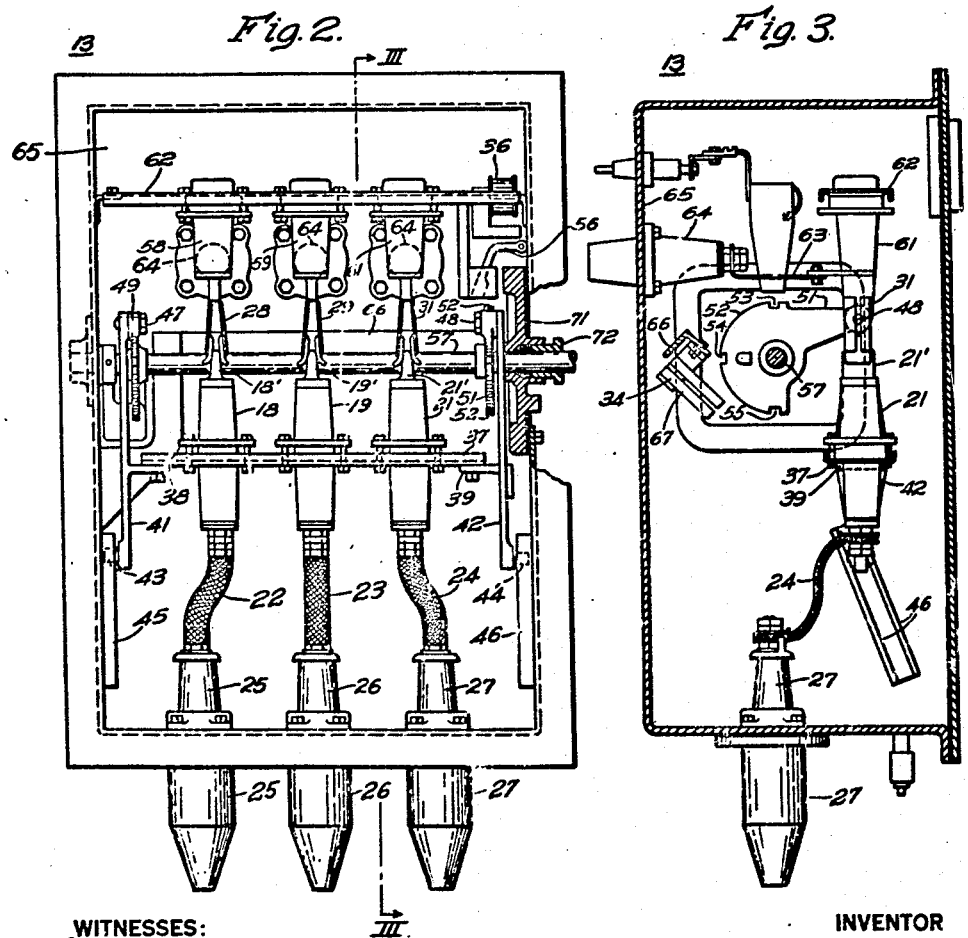
Fig. 2 is an elevational view of a grounding switch and its operating mechanism mounted within a switch chamber, the front cover of which is shown removed.
Fig. 3 is a sectional view taken along the line III—III of Fig. 2 showing a portion of the switch and its operating mechanism.

Referring to Figs. 2 and 3, the bushing assemblies 18, 19 and 21 are mounted on a bushing bridge 37, the ends of which are attached to flanges 38 and 39 respectively of connecting rods 41 and 42, the lower ends of which are respectively provided with pins 43 and 44 that are slidably mounted between guides 45 and 46 respectively. The upper ends of the connecting rods 41 and 42 are pivotally connected at 47 and 48 respectively, to the outer ends of levers 49 and 51 that extend forwardly from a shaft 57 and are fixed to rotate with the shaft. The lever 51 (see Fig. 3) is formed to provide a cam 52 having slots 53, 54 and 55 at 90° intervals about its periphery to receive a latch 56 of electrical interlocking mechanism which is forced into engagement with the cam when the winding 36 of the interlock is energized.

The contact members 28, 29 and 31 are mounted respectively on the lower ends of the insulating bushings 58, 59 and 61 that are mounted on a bushing bridge 62. As shown in Fig. 3, the contact members are connected as by conductors 63 through the terminal bushings 64 that extend through the side of the switch housing wall 65 which may also be the side wall of the transformer containing the windings 9, 11 and 12 to which contact members 28, 29 and 31 are connected.

Figure 4:
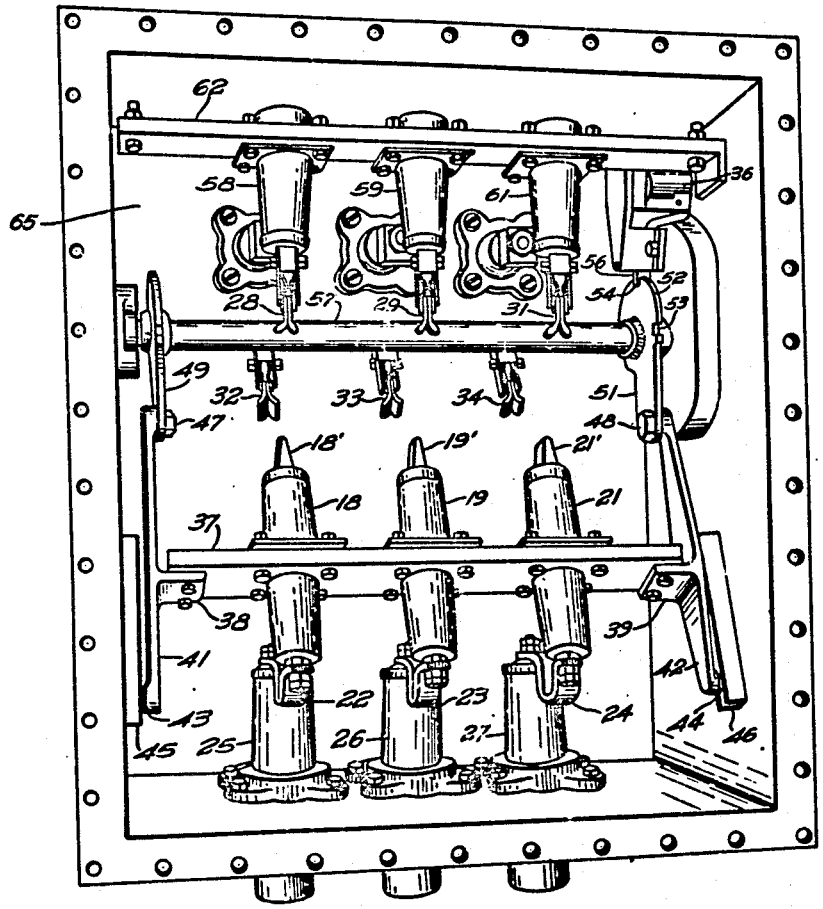
Fig. 4 is a perspective view of the switch chamber showing the switch in its open circuit position.

Directly in back of the shaft 57, as viewed in Figs. 2 and 4, a bar or contact support 66 extends parallel to the shaft and carries three switch terminals 32, 33 and 34 for receiving the terminals 18', 19' and 21' of the switch to connect them to a common ground 35. One of the switch terminals 34 is illustrated in Figs. 3 and 5 and the three terminals or contacts are connected together, and to ground, to give complete protection for grounding the transmission line or feeder should the line become energized.

The switch is shown in Figs. 2 and 3 in its transformer connecting position in which the high voltage feeder conductors extending through the bushings in the bottom of the switch casing are connected to the high-voltage transformer windings through the bushings in the rear of the casings. If, in this position of the switch either the network protector or circuit breaker 5, or the circuit breaker 14 is in its closed position, the windings of the transformer will be energized, thus energizing the winding 36 of the electrical interlock and causing the latch 56 to be forced downwardly into the slot 53 in the cam 52, thus preventing the rotation of the shaft 57 and the operation of the switch. When it is desired to operate the switch to another position, it is necessary to first disconnect the transformer from its primary and secondary circuits, thus deenergizing the transformer and the feeder supplying it, and the winding 36 of the electrical interlock which allows the latch 56 to move from the slot 53 to the position illustrated in Fig. 2. If the circuit breaker or network protector 5 is automatically controlled as described in the above referred to patent to Palmer, it is only necessary to trip the circuit breaker 14 in order to deenergize the transformer, since, when the transformer is disconnected from its power source, the flow of magnetizing current to the transformer will be from the network through the circuit breaker 5, which will cause its operation to disconnect the transformer from the low voltage circuit conductors 6, 7 and 8. Should it now be desired to operate the switch to its grounding position, the shaft 57 and the lever arms 49 and 51 that operate the movable contact members are rotated through substantially 180° in a clockwise direction as viewed in Fig. 3.

During the first portion of this movement, the terminals 18', 19' and 21' are separated from the contact members 28, 29 and 31, respectively, the pins 43 and 44, at the lower ends of the connecting rods 41 and 42, sliding downwardly within the guides 45 and 46 until the shaft 57 has been rotated 90° bringing the switch to its full open position as illustrated in Fig. 4, at which point the slot 54 in the cam 52 will be directly under the latch 56. As the rotation of the shaft 57 continues through another 90° or until the slot 55 of the cam 52 is directly under the latch 56, the connecting rods 41 and 42, carrying the bushing bridge 37 and the bushings 18, 19 and 21, will be moved in an upward and backward direction until the terminals 18', 19', and 21' engage their corresponding grounding terminals 32, 33 and 34 mounted on the connector bar 66. The shaft 57 for operating the switch extends out of the switch chamber through an opening in the casting 71 and a packing gland 72 therein, forming a bearing for the shaft as shown in Figs. 2 and 7.

As illustrated in Figs. 6 and 7, an indicating lever 73 is fastened to the end of the shaft 57 by a suitable means such as the pin 74 and extends in the opposite direction from the shaft as at 75, which extension may be sufficient to provide an operating handle for rotating the shaft 57 or the handle 76 may be employed as illustrated in Fig. 6. A latch 77 is provided and is pivotally mounted at 78 within a slot extending downwardly through the portion 75 of the lever and is provided with an upwardly extending handle 79. The casting 71 is provided with an upwardly extending semi-circular abutment or wall 81 in which slots 82, 83 and 84 are provided at 90° intervals for receiving the latch 77. A lug 85 extends upwardly from the portion 75 of the lever and is provided with a hole 86 therein opposite a similar hole in the handle of latch 77 for receiving a locking means to prevent operation of the latch from any one of the slots 82, 83 or 84, in which it may be positioned, thus preventing operation of the switch by an unauthorized person. The lever 73 is provided with a shield extending to one side therefrom, the outer periphery 89 of which is substantially semi-circular in outline and covers a latch 91 mounted directly below the shield upon a pin 92 extending into the casting 71 and retained thereon by means of a washer 93 and cotter pin 84. A spring 95 is provided having one end extending upwardly into the hole 96 in the underpart of the latch or pawl 91 and its lower end extending in a similar hole in the casting 71, the spring being so biased as to move the pawl 91 in a counter-clockwise direction as viewed in Fig. 6 until the longer end thereof engages the end of a U shaped wall 97 extending upwardly from the casting 71 and surrounding the end of the pawl. The short end of the pawl 91 is provided with a surface 99, that in the position "A" of the pawl, or as illustrated in dotted lines, is adjacent the end of the latch 77.

The purpose of the mechanical interlocking illustrated in Figs. 6 and 7 is to prevent operation of the switch from its open circuit position to its grounding position without first going to its transformer connecting position, since it is possible that, after the switch has been operated to its open circuit position, the circuit breakers 5 and 14 may have been operated to their closed circuit position, in which case the operation of the grounding switch from its open to its grounding position directly would short circuit the power circuit conductors while energized and might result in severe destruction to the grounding switch. If, however, the circuit breakers 5 and 14 are in their circuit closing positions when the grounding switch is operated to its transformer connecting position, the electrical interlock will prevent further operation of the switch until the circuit breakers are again opened. Referring again to Figs. 6 and 7, it will be noted that operation of the lever 79 to the position shown in dotted lines, removes the latch 77 from the slot 83 in the wall 81, bringing it adjacent the surface 99 of the pawl 91 when the pawl is in its position illustrated at "A" and prevents operation of the shaft 57 in a counterclockwise direction, or from the "open" to the "ground" position of the switch. Before operating the switch to its ground position, it is necessary to move the pawl 91 to the position illustrated at "B" by manually grasping the end 98 of the pawl and swinging it in a clockwise direction through an arc of about 90°, and to hold it in this position during a part of the movement of the switch. The U shaped wall 97 rising from the casting 71 and the baffle or guard 89, extending over the pawl integral with the lever 73 prevents manual operation of the pawl when the switch is in its open position.

The operating and indicating lever 73 may, however, be rotated in a clockwise direction closing the switch, in its transformer connecting position, that is, bringing the lever 73 to a point directly above the shaft 57, as viewed in Fig. 6, in which position the end 98 of the pawl 91 in position "A" is sufficiently uncovered to permit it to be grasped and move to the position "B". While holding the pawl in this position, the shaft 57 may be rotated through 180° in a counter-clockwise direction, as viewed in Fig. 6, to its ground connecting position. As the shaft is so rotated, it is necessary, as soon as the movement of the shaft from the "transformer" to the "ground" position of the switch is a little over half completed, to release the pawl 91 which is then moved by the spring 95 to the position illustrated at "A". When the lever 73 is again moved from the "ground" position to the "open" position of the switch, the latch or pawl 91 is then in position to prevent return to the "ground" position prior to operation of the switch to the "transformer" position.

Should either of the circuit breakers 5 or 14 be closed when the switch is moved from the "open" to the "transformer" position in the operation described above, the winding 36 of the electrical interlock will become energized as soon as the switch closes in this position and the latch will drop into a slot in the cam 52 thus preventing further operation of the switch until both circuit breakers 5 and 14 are in their open positions.

It will, therefore, be seen that the switch can be operated from its open position only in a direction to close the switch in its transformer connecting position, from which position it may be operated to the grounding position provided the transformer is deenergized.

Many modifications of the structure illustrated and described may be made within the spirit of my invention and I do not wish to be limited other than by the scope of the appended claims.

I claim as my invention:

1. In combination, an electrical apparatus, a power circuit, means for connecting said power circuit to said electrical apparatus, or to ground, means for preventing operation of said connecting means from one to another of its positions when the apparatus is energized, and means for preventing the operation of said connecting means from its open circuit position except in a predetermined manner.

2. In combination, an electrical apparatus, a power circuit, means for connecting said power circuit to said electrical apparatus, or to ground, means for preventing operation of said connecting means from one to another of its positions when the apparatus is energized, and means for preventing the operation of said connecting means from its open circuit position to its ground position except in a predetermined sequence of steps including the step of operating the connecting means to its apparatus connecting position.

3. In combination, an electrical apparatus, a power circuit, means for connecting said power circuit to said electrical apparatus or to ground comprising a three position switch having an apparatus connecting position, a ground connecting position, and an open circuit position, means for preventing the operation of said switch from one to another of its positions when the apparatus is energized, and means for preventing the operation of the switch from its open circuit position to its ground connecting position except through its apparatus connecting position.

4. In combination, an electrical apparatus, a power circuit, a three position switch having an apparatus connecting position for connecting said circuit to said apparatus, a ground position for connecting said circuit to ground, and an open circuit position, the open circuit position being intermediate the other two positions, and means for preventing the operation of the switch directly from its open circuit position to its ground connecting position.

5. In combination, an electrical apparatus, a power circuit, a three position switch having an apparatus connecting position for connecting said circuit to said apparatus, a ground position for connecting said circuit to ground, and an open circuit position, the open circuit position being intermediate the other two positions, and means for preventing the operation of the switch from its open circuit position except toward its apparatus connecting position.

6. In combination, an electrical apparatus, a power circuit, a three position switch having an apparatus connecting position for connecting said circuit to said apparatus, a ground position for connecting said circuit to ground, and an open circuit position, the open circuit position being intermediate the other two positions, means for preventing the operation of said switch from any one of its positions when the apparatus is energized, and means for preventing the operation of the switch from its open circuit position to its ground connecting position without first operating it to its apparatus connecting position.

HENRY S. GATES.